United States Patent
Pietschmann

[11] 3,722,095
[45] Mar. 27, 1973

[54] TAKE-UP SYSTEM FOR DENTAL UNITS AND THE LIKE

[75] Inventor: Helmut Richard Pietschmann, Karlsruhe-West, Germany

[73] Assignee: Sybron Corporation, Rochester, N.Y.

[22] Filed: Mar. 9, 1971

[21] Appl. No.: 122,436

[30] Foreign Application Priority Data

Mar. 10, 1970 Germany.................P 20 11 198.2

[52] U.S. Cl.....................................................32/22
[51] Int. Cl................................................A61c 19/02
[58] Field of Search ...........137/355.2, 355.23; 32/22

[56] References Cited

UNITED STATES PATENTS

| | | | |
|---|---|---|---|
| 3,304,609 | 2/1967 | Horowitz et al. | 32/22 |
| 2,221,566 | 11/1940 | Barks et al. | 137/355.2 |
| 3,391,875 | 7/1968 | Hamrick | 137/355.23 |

Primary Examiner—Robert Peshock
Attorney—Theodore B. Roessel

[57] ABSTRACT

The invention pertains to a take-up system particularly for dental units in which the utility lines connected to the treating instrument are retracted into the unit by means of a movable pulley which is moved by an air driven piston.

6 Claims, 2 Drawing Figures

PATENTED MAR 27 1973 3,722,095

TAKE-UP SYSTEM FOR DENTAL UNITS AND THE LIKE

BACKGROUND OF THE INVENTION

The present invention pertains to take-up systems for dental units and, more particularly, to an air driven take-up system wherein the utility lines connected to the treating instrument are retracted into the unit by means of an air driven piston.

In dental units wherein the dental instrument is nested in the unit, it is often desirable to provide a retraction mechanism for pulling the extended utility cord, hose, etc., connected to the dental instrument back into the unit after the instrument such as an electrically or pneumatically driven hand piece, syringe, etc., has been used. This retraction can be accomplished by several known methods, for example, in one type of retraction system, the utility line is pulled back into the unit by means of a spring force. In other retraction systems, a system of counter weights may be used to retract the utility line.

In the aforementioned types of retraction systems, there is the common disadvantage that in order for the operator to remove the instrument from the unit, he must overcome the spring or gravitational force acting on the utility line. Furthermore, in many cases, this gravitational or spring force is allowed to act on the line even while the instrument is being used and this makes the manipulation of the instrument more difficult. The retraction force on the utility line while the instrument is being used may be compensated by the use of a detent or brake mechanism acting on the utility line. Even in this case, however, the problem still exists that the operator must initially bring the instrument into use against this gravitational or spring rewind force.

The present invention, however, utilizes a retraction or take-up system which reduces the resistance against pulling instruments into use to a minimum thereby reducing the work expended by the operator.

SUMMARY OF THE INVENTION

According to the present invention, the utility line is placed about at least one horizontally movable pulley which is connected by a cable to an air driven piston. The piston offers a minimum of resistance when the instrument is being pulled from the unit but provides the necessary force for moving the pulley linearly to retract the utility line when the cylinder in which the piston rides is pressurized.

OBJECTS OF THE INVENTION

One object of the present invention is to provide a retraction mechanism which offers little or no resistance when the dental instrument is pulled from the unit.

Another object of the present invention is to provide a retraction mechanism which allows the utility line to remain slack after the instrument has been pulled from the unit without the use of any brake mechanism acting on the utility line.

Still another object of the present invention is to provide a retraction system which utilizes an air driven piston to retract the utility line wherein the cylinder in which the piston rides acts as a guide during the retraction of the utility line into the dental unit.

These and other objects, advantages and characterizing features of the present invention may become more apparent upon consideration of the following detailed description thereof when taken in connection with the accompanying drawings depicting the same.

DESCRIPTIONS OF THE DRAWINGS

FIG. 1 is a perspective view of a dental unit with one instrument, a dental hand piece, shown out of its nested position in the unit; and FIG. 2 is an elevation view schematically representing the retraction system.

DESCRIPTION OF THE PREFERRED EMBODIMENTS

Figure 1:
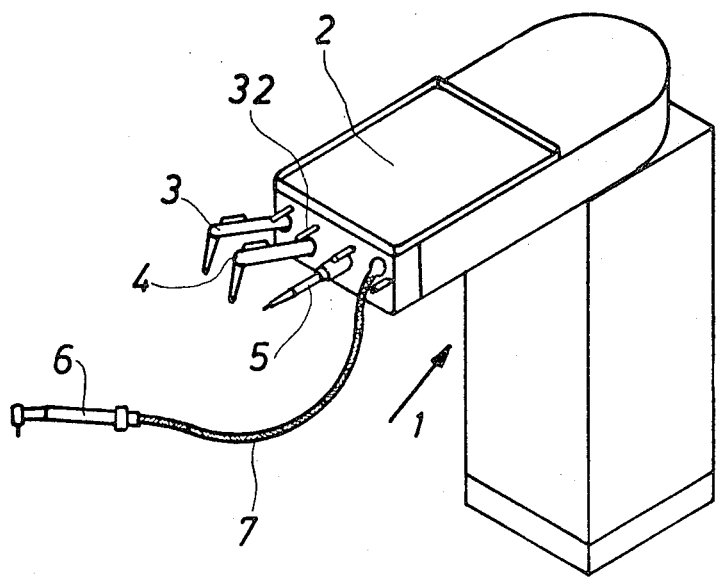
Figure 2:
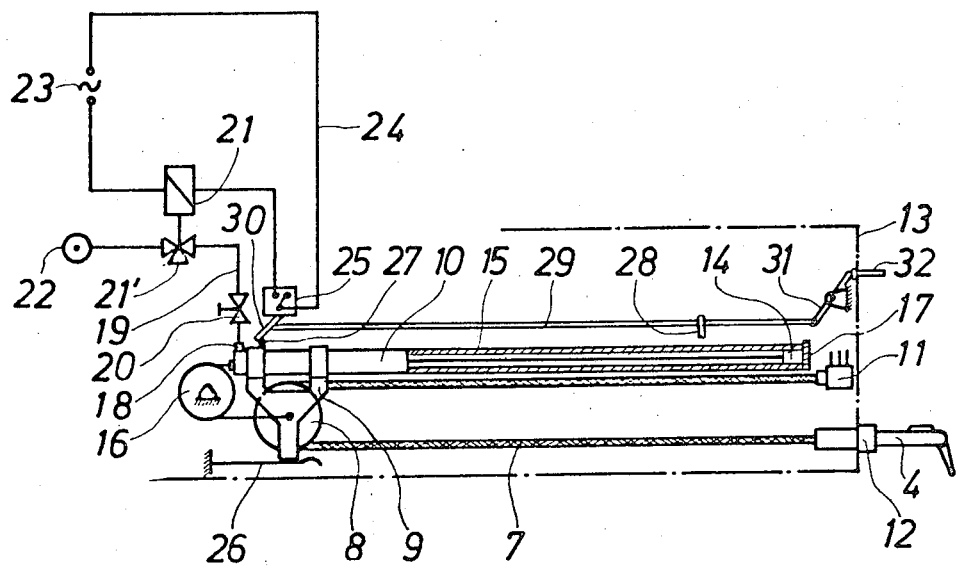

Referring to the drawings, FIG. 1 shows the dental unit at 1 having a generally horizontally oriented instrument holder portion 2 which may be rotated about a vertical axis and adjusted in height. This instrument holder portion carries the various treating instruments required by the patient, as for example, syringes 3 and 4 and drilling hand pieces 5 and 6. These instruments when not in use are held in brackets or nests 12 at the front 13 of the instrument holder (FIG. 2). Handpiece 6 is shown in a position extended from the instrument holder 2 to show the utility line 7 which connects the hand piece to the utility power source.

Referring to the schematic representation shown in FIG. 2, the take-up system of which there would be one for each instrument is shown to include a guide pulley 8 carried by a movable yoke 9 which in turn is slidably supported on a compressed air cylinder 10. The cylinder 10 is horizontally disposed and extends substantially front to back within instrument holder 2. The cylinder also functions as a guide member for the sliding yoke 9. The utility line 7 which is connected to the dental instrument, such as syringe 4, passes over this pulley 8 with one end of the line being connected to a utility terminal 11 at the front of the instrument holder portion and the other end of the dental instrument. All the components thus far described except for the instrument are disposed within instrument holder portion 2 represented by the dot and dash line in FIG. 2.

A piston 14 within the air cylinder is connected to yoke 9 by means of a flexible cable 15 which passes over a pulley 16 fixed at the rear of the instrument holder. As viewed in FIG. 2, the right hand or forward end of air cylinder 10 is provided with an opening 17 which vents the cylinder to the atmosphere so that it is possible to move the piston back and forth within the cylinder without developing a super or subatmospheric pressure on the forward end side of the piston. At the opposite or rearward end of the compressed air cylinder, that is, at the left hand side as viewed in FIG. 2, there is another hole (not shown) through which passes cable 15. However, the resulting air gap at this end of the piston is small enough (being sufficient only to pass the thin strand of wire comprising cable 15) so that a desired pressure condition can be generated without difficulty within the cylinder on this side of the piston.

Also, at the rear or left side of the cylinder, is a connection 18 for a compressed air line 19 which introduces driving air into the cylinder from any suitable air source 22. Line 19 is provided with a volume control valve 20 and a three-way valve 21' for controlling the flow of air into the cylinder. In the condition as shown in FIG. 2, one port of the three-way valve 21' would be open to atmosphere so that the rear side of cylinder 10 would also be open to atmosphere through line 19 and the open port of valve 21'. Valve 21' is in a circuit which includes a valve operating solenoid 21, a voltage source 23, a conductor 24 and a switch 25 for purposes set out hereinbelow.

A lever 30 which is engageable with a pin 27 carried by yoke 9 is provided for actuating switch 25 when the yoke and pulley are in a first position at the rear of the instrument holder. Lever 30 is also connected to one end of a switching rod 29, the other end of the rod being supported adjacent the forward end of the instrument holder to permit axial movement of the rod. A stop 28 which extends down into the path of travel of pin 27 is fixed adjacent the forward end of the rod. Accordingly, with yoke 9 in the position shown in FIG. 2, pin 27 is engaged against lever 30 to open switch 25. On the other hand, when yoke 9 is moved toward the front 13 of the instrument holder, pin 27 engages stop 28 which moves the switching rod 29 and lever 30 to throw the switch 25 to a closed position.

In the resting state, that is, when the dental instrument is located in sleeve 12, the circuit for operating valve 21' is held open by switch 25. This results from the engagement of pin 27 against lever 30 as shown in FIG. 2. As a result of the circuit being open, air cylinder 10 is unpressurized on both sides of piston 10: on the forward side the air cylinder is open to atmosphere through hole 17 and on the rearward side the cylinder is open to atmosphere through line 19 and one outlet of the three-way valve 21'.

When the hand piece is taken from sleeve 12 and the utility line 7 pulled out of instrument holder portion 2, pulley 8 and yoke 9 are pulled toward the front wall 13 of the instrument holder. In this respect, yoke 9 rides along the outer surface of air cylinder 10 and is guided in its movement by the air cylinder. As yoke 9 moves to the right as viewed in FIG. 2, it passes off of a spring 26 which may be provided to arrest the yoke in the withdrawn position in order to maintain a slight tension on the utility line 7. However, this spring 26 can be omitted if a slight sagging of the utility line within the instrument holder is not objectable. In any event, once yoke 9 passes off of spring 26, the operator can pull out the utility line to any desired length with a minimum of effort since there is no force tending to return the line to a position within the instrument holder. Further, the operator will be free to use the instrument without first having to set a brake to lock the utility line against a rewind force.

It should be understood that when the instrument and utility line are pulled from the instrument holder and yoke 9 is moved to the right as viewed in FIG. 2, piston 14 which is connected to the yoke by means of cable 15 is pulled to the left as viewed in FIG. 2. As the piston is moved to the left, air is exhausted from the left hand or rearward side of the air cylinder through connector 18, valve 20, line 19, and the open port of valve 21'. Since there is no build up of pressure within the cylinder as the piston is moved, only a minimum of resistance must be overcome to pull the instrument into use.

Once the dentist or operator has finished with the particular instrument he is using, he can cause the retraction of the utility line back into the instrument holder by either of two methods. On the one hand, he can pull the instrument to extend the utility line out to its full length so that pin 27 carried on yoke 9 will engage stop member 28. This engagement causes the switching rod 29 to move to the left as viewed in FIG. 2 which in turn throws lever 30 to close switch 25. Closing switch 25 energizes the circuit to activate solenoid 21 and its associated valve 21'. Operating valve 21' now allows compressed air from source 22 to flow through line 19, the volume control valve 20 and connector 18 into the air cylinder 10 pressurizing this portion of the air cylinder. Air pressure in this portion of the cylinder when pushes the piston to the right as viewed in FIG. 1. The air within cylinder 10 ahead of the moving piston is exhausted to atmosphere through hole 17. The speed of retraction may be set initially by adjusting the flow control valve 20.

As the piston is moved by the compressed air, the piston pulls on cable 15 causing yoke 9 and pulley 8 to move to the left as viewed in FIG. 2. This takes the utility line back into the instrument and allows the instrument to be returned to nest 12. When yoke 9 is moved to its initial or starting position, pin 27 engages lever 30 to operate switch 25 and open the electrical circuit to solenoid 21 and close valve 21'.

An alternative way of accomplishing the retraction of the utility line back into the instrument holder would be to push a button or switch 32 on the front 13 of the instrument holder. This could be connected to switching rod 29 by a lever arm 31 to operate lever 30 and switch 25.

Having thus described the invention in detail, what is claimed as new is:

1. A utility line take-up system for use with dental units of the type having an instrument holder portion which releasably nests at least one dental instrument and a utility line connected to the instrument, said take-up system comprising:
   a. a horizontally oriented air cylinder in said instrument holder, said cylinder extending from front to back in said instrument holder and having one end vented to atmosphere;
   b. a yoke member slidably supported by said air cylinder for guided movement along said cylinder;
   c. a first pulley member journaled to said yoke member with said utility line having one end fixed adjacent the front of said instrument holder and being trained over said pulley with the other end of said utility line connected to a dental instrument;
   d. a piston in said cylinder;
   e. a second pulley member journaled adjacent the rear of said instrument holder;
   f. a cable fixed to and extending between said piston and first pulley and trained over said second pulley whereby movement of either of said piston or first pulley slidably moves the other in the opposite direction; and
   g. means communicating with the second end of said cylinder for selectively venting or pressurizing the portion of said cylinder between said piston and said second end, i. said second end being vented to permit free movement of said piston by said first pulley as said instrument and utility line is pulled from said instrument holder, and ii. said second end being pressurized for driving said piston and therefore said first pulley to return said utility line into said instrument holder.

2. Apparatus as set forth in claim 1 wherein said means comprises:

a. an air line connected to said second end for supplying pressurized air thereto;

b. a valve in said line movable between a first position for venting said second end to atmosphere and a second position for pressurizing said second end;

c. means for operating said valve including a switch member operated when said pulley member is adjacent the back of said instrument holder to move said valve to said first position and operated when said pulley member is adjacent the front of said instrument holder to move said valve to said second position.

3. Apparatus as set forth in claim 2 wherein said means for operating said valve includes a pin movable along a horizontal path of travel with said pulley member and engageable with said switch when said pulley is adjacent the rear of said instrument holder to throw said switch to said first position.

4. Apparatus as set forth in claim 3 wherein said means for operating said valve includes:

a. a bar having a first end attached to said switch and a second end movably supported adjacent the front of said instrument holder;

b. a stop on said bar adjacent the front of said instrument holder and extending into the path of travel of said pin, said pin engaging said stop when said pulley is adjacent the front of said instrument holder to move said bar axially and throw said switch to said second position.

5. Apparatus as set forth in claim 4 comprising a manual switch on said instrument holder portion and connected to the second end of said bar for manually moving said bar axially.

6. Apparatus as set forth in claim 1 comprising a spring member at the rear of said instrument holder for capturing said pulley to maintain tension on said utility lines stored within said instrument holder.

* * * * *